United States Patent [19]
Labs et al.

[11] Patent Number: 5,121,804
[45] Date of Patent: Jun. 16, 1992

[54] FISHING POLE AND MEASURING APPARATUS

[76] Inventors: David A. Labs, 150 Lincoln Ave., Telford, Pa. 18969; David M. Meyers, RD #2 Box 127-A, Emmaus, Pa. 18049

[21] Appl. No.: 668,227

[22] Filed: Mar. 12, 1991

[51] Int. Cl.⁵ .............................................. G01G 19/60
[52] U.S. Cl. .................................. 177/132; 177/148; 177/245
[58] Field of Search ..................... 177/132, 148, 245

[56] References Cited
U.S. PATENT DOCUMENTS 1,750,193  3/1930  Reynolds ........................... 177/245
2,237,370  4/1941  Shekter ............................... 177/245
4,721,174  1/1988  Letzo ............................... 177/245 X Primary Examiner—George H. Miller, Jr.
Attorney, Agent, or Firm—Leon Gilden

[57] ABSTRACT

A fishing pole is provided wherein the handle is defined as a scale, with a hook projecting coaxially and exteriorly of the handle at a rear terminal end thereof for mounting and weighing of a fish thereon. A further embodiment of the invention for use in bait casting organizations mounts a scale in parallel contiguous relationship relative to the handle, with the hook directed orthogonally relative to the housing of the scale for weighing of fish subsequent to their catching.

5 Claims, 4 Drawing Sheets

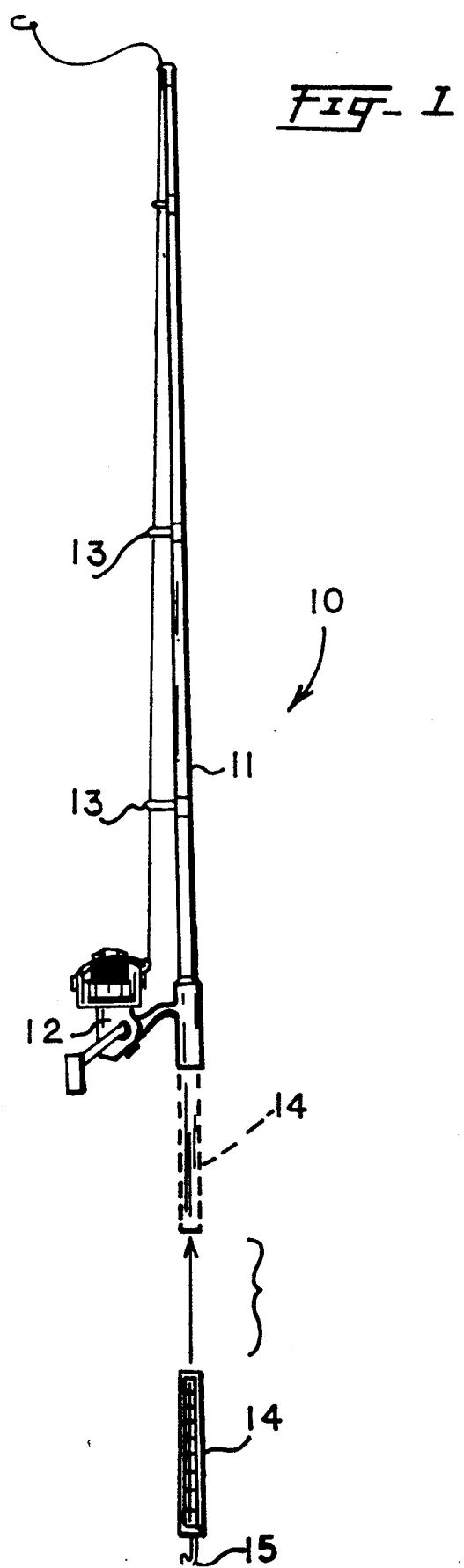
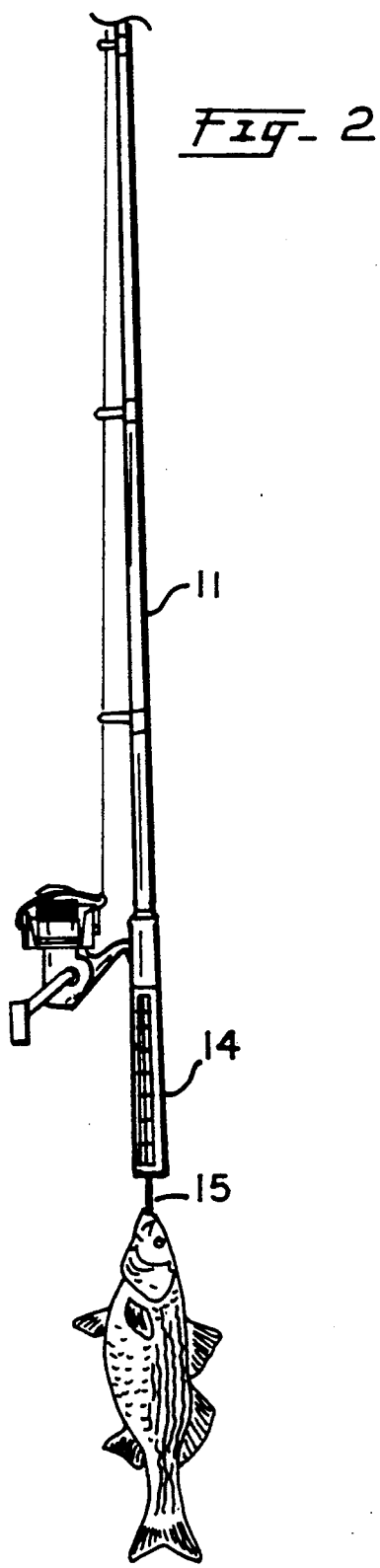

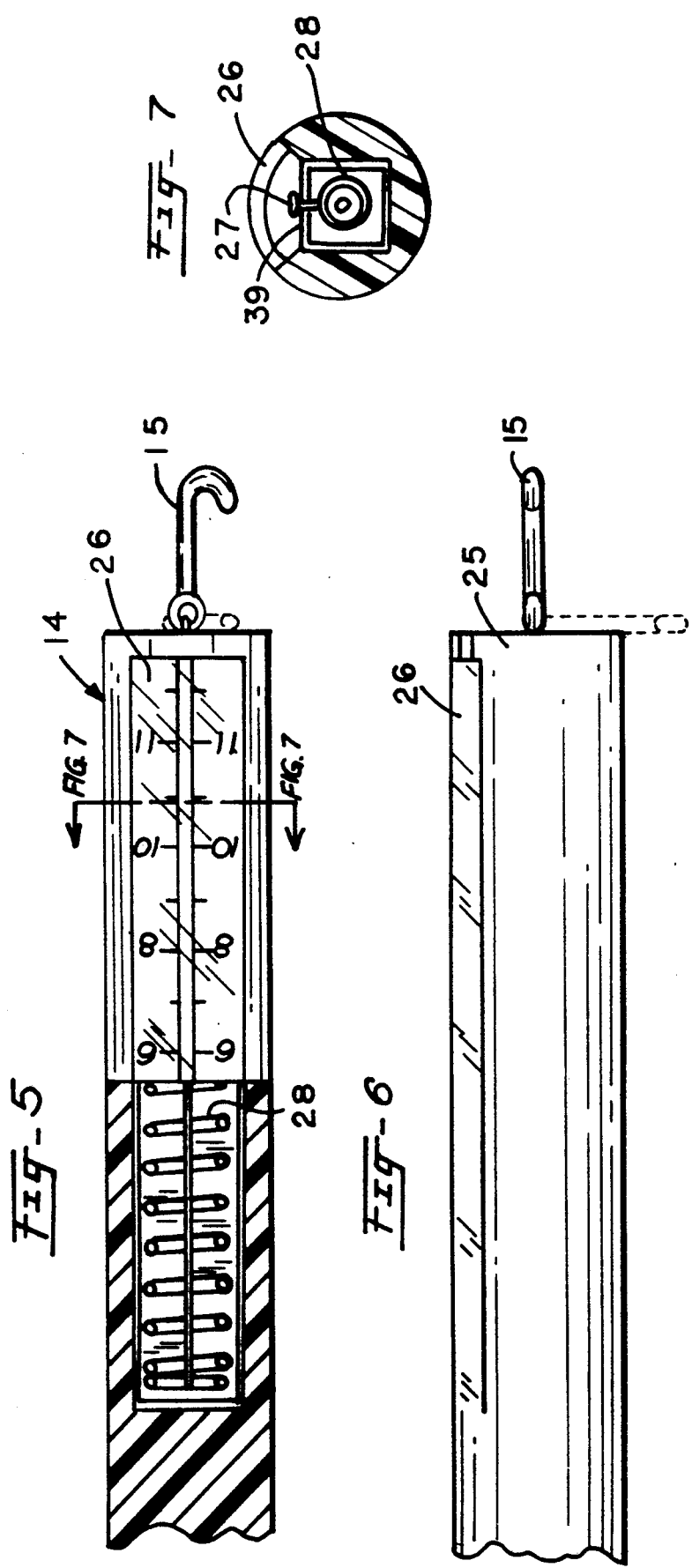

FISHING POLE AND MEASURING APPARATUS

BACKGROUND OF THE INVENTION

1. Field of the Invention

The field of invention relates to fishing apparatus, and more particularly pertains to a new and improved fishing pole and measuring apparatus wherein the same provides subsequent weighing of fish to their having been landed.

2. Description of the Prior Art

Various fishing apparatus is utilized in the prior art to accessorize and assist in the catching of fish and their processing. Scales have been utilized in the prior art in association with fishing equipment such as exemplified in U.S. Pat. No. 3,276,527 to Nelson wherein a scale defined therein is arranged as a tube for retrofit securement in coaxial surrounding relationship relative to a fishing pole handle.

U.S. Pat. No. 4,765,429 to Mengo sets forth a scale for fish, wherein the scale is mounted in a slidable relationship relative to a net structure for landing the fish.

U.S. Pat. No. 4,721,174 to Letzo sets forth a scale for mounting to a fishing pole, wherein a deflecting rod is orthogonally aligned relative to the handle and deflected upon hanging a fish relative to the rod.

U.S. Pat. No. 3,223,189 to Robbins sets forth a scale in association with a landing net, wherein the scale is mounted in a surrounding relationship relative to the handle of the net structure.

As such, it may be appreciated that there continues to be a need for a new and improved fishing pole and measuring apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing pole apparatus now present in the prior art, the present invention provides a fishing pole and measuring apparatus wherein the same mounts a scale in association with a fishing pole handle for subsequent weighing of fish. As such, the general purpose of the present invention, which will be described subsequently in greater detail, is to provide a new and improved fishing pole and measuring apparatus which has all the advantages of the prior art fishing pole apparatus and none of the disadvantages.

To attain this, the present invention provides a fishing pole wherein the handle is defined as a scale, with a hook projecting coaxially and exteriorly of the handle at a rear terminal end thereof for mounting and weighing of a fish thereon. A further embodiment of the invention for use in bait casting organizations mounts a scale in a parallel contiguous relationship relative to the handle, with the hook directed orthogonally relative to the housing of the scale for weighing of fish subsequent to their catching.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing pole and measuring apparatus which has all the advantages of the prior art fishing pole apparatus and none of the disadvantages.

It is another object of the present invention to provide a new and improved fishing pole and measuring apparatus which may be easily and efficiently manufactured and marketed.

It is a further object of the present invention to provide a new and improved fishing pole and measuring apparatus which is of a durable and reliable construction.

An even further object of the present invention is to provide a new and improved fishing pole and measuring apparatus which is susceptible of a low cost of manufacture with regard to both materials and labor, and which accordingly is then susceptible of low prices of sale to the consuming public, thereby making such fishing pole and measuring apparatus economically available to the buying public.

Still yet another object of the present invention is to provide a new and improved fishing pole and measuring apparatus which provides in the apparatuses and methods of the prior art some of the advantages thereof, while simultaneously overcoming some of the disadvantages normally associated therewith.

Still another object of the present invention is to provide a new and improved fishing pole and measuring apparatus wherein the same utilizes a measuring scale arranged for convenient and effective measuring of fish relative to their weight.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view, taken in elevation, of the instant invention.

FIG. 2 is an orthographic side view of the instant invention, taken in elevation, in association with a fish weighing procedure.

FIG. 5 is an orthographic top view of the first embodiment scale utilized by the instant invention.

FIG. 6 is an orthographic side view, taken in elevation, of the first embodiment scale utilized by the instant invention.

FIG. 7 is an orthographic view, taken along the lines 7—7 of FIG. 5 in the direction indicated by the arrows.

DESCRIPTION OF THE PREFERRED EMBODIMENT

Figure 3:
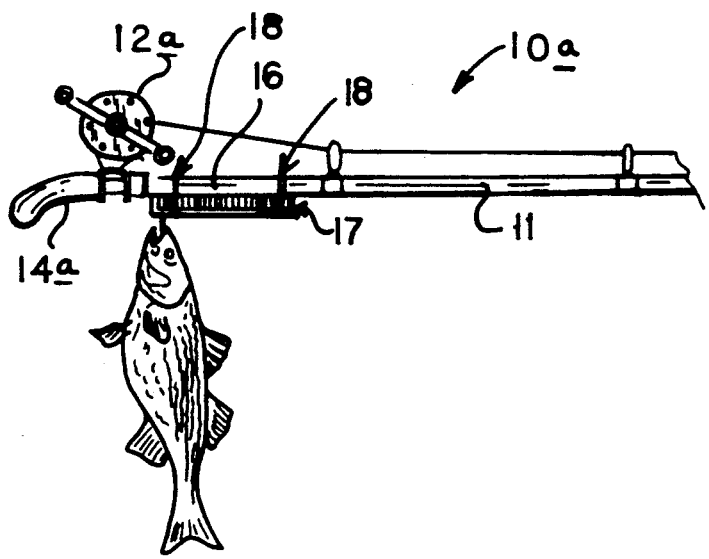
FIG. 3 is an orthographic side view, taken in elevation, of a further example of the instant invention.
Figure 4:
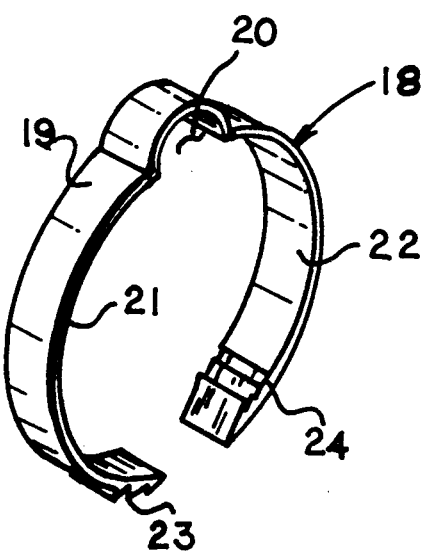
FIG. 4 is an isometric illustration setting forth the use of a clamp structure utilized by the instant invention.
Figure 8:
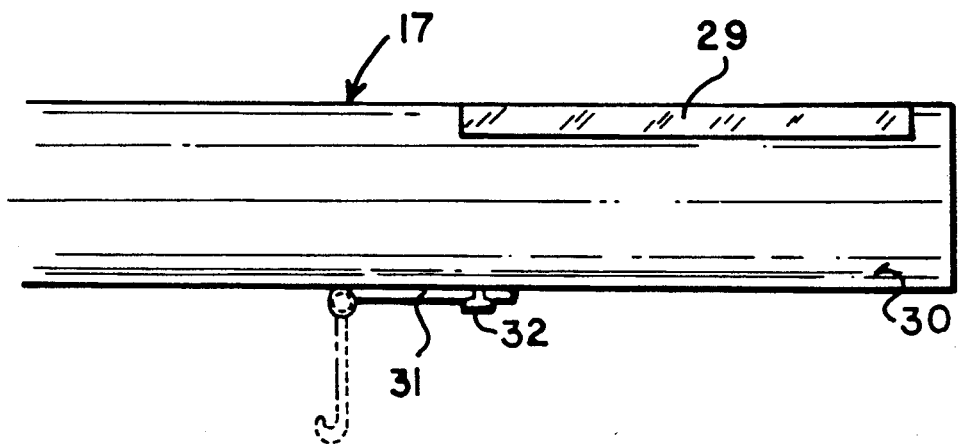
FIG. 8 is an orthographic side view, taken in elevation, of the modified scale structure utilized by the instant invention as depicted in FIG. 3.
Figure 9:
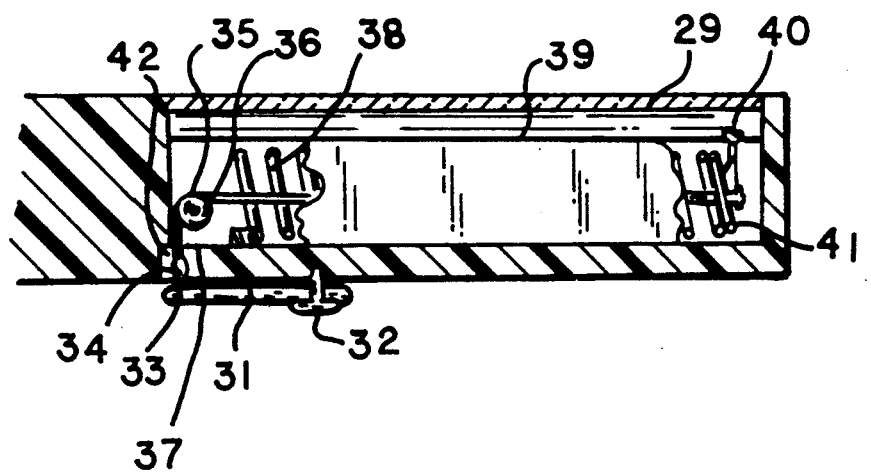
FIG. 9 is an orthographic cross-sectional illustration of the scale, as illustrated in FIG. 8.

With reference now to the drawings, and in particular to FIGS. 1 to 9 thereof, a new and improved fishing pole and measuring apparatus embodying the principles and concepts of the present invention and generally designated by the reference numeral 10 will be described.

More specifically, the fishing pole and measuring apparatus 10 of the instant invention essentially comprises an elongate fishing rod 11 mounting a spinning type reel 12 to the handle, wherein the handle is defined as a fishing pole handle, including a cylindrical housing formed with a weight measuring scale coextensively therewith. The weight measuring scale includes a mounting hook 15 directed exteriorly of the rear end of the housing, with the hook mounted coaxially with the scale at its projection of the rear end of the handle. The apparatus is utilized to secure a fish thereon subsequent to its having been caught for a weighing procedure. The scale utilized is depicted in detail in FIGS. 5-7, wherein the cylindrical housing 25 includes a transparent arcuate window 26 positioned overlying an associated slotted gauge, wherein an indicator light 27 is positioned therethrough. The indicator light 27 is aligned with that portion of the scale 39 through deflection of the associated coil spring 28 mounted within the cylindrical housing underlying the transparent window.

FIG. 3 illustrates the use of a modified organization 10a utilized by the instant invention, wherein the scale member 17 is mounted contiguous to the fishing rod 11 positioned forwardly of the associated handle 14a. The scale member 17 is defined by an elongate, cylindrical housing 30 (see FIGS. 8 and 9), wherein a plurality of mounting clamps 18 secure the scale member to the fishing pole forwardly of and adjacent the handle 14a about a lower portion of the fishing rod 11. The mounting clamps 18 are each formed as a discontinuous band 19 that include a semi-cylindrical recess 20 positioned medially of a respective first and second band leg 21 and 22. The first band leg includes a first toothed surface 23 that is formed on a free terminal end of the first band leg to an exterior surface thereof, wherein the first toothed surface 23 is securable to a second toothed surface 24 that is formed on an interior surface of the second band leg 22. The semi-cylindrical recess 20 receives a fishing rod 11 therewithin to maintain each of the bands in a predetermined orientation relative to the cylindrical housing 30. The cylindrical housing 30 includes an arcuate transparent window 29 directed longitudinally of the housing 30 through a cylindrical wall thereof. A mounting hook 31 is mounted to a pivot ring 33 that in turn is secured to a swivel connection 34 positioned in a retracted position within a through-extending bore 42, wherein the through-extending bore 42 is directed radially through a cylindrical wall of the housing diametrically opposed to the window 29. The swivel connection 30 mounts a forward terminal end of a cable 36 that is directed about a pulley 35 at a forward end of the housing 30, wherein the pulley overlies a through-extending bore 42. The cable 36 is coaxially directed through the housing 30 interiorly thereof and medially about a coil spring 38 that is positioned and in abutment with an abutment ring 37 of a torroidal configuration positioned adjacent the pulley 35. The coil spring 38 is directed through the housing and includes an abutment disk 41 mounted about the coil spring on a rear terminal end thereof, wherein the abutment disk 41 fixedly mounts an indicator leg 40. The indicator leg 40 projects radially from the disk 41 through an associated slot, such as a type as illustrated in FIG. 7 in association with a scale 39. A "T" shaped support boss 32 positioned adjacent the through-extending bore 42 in the housing receives the mounting hook 31 about the "T" shaped boss 32 about the stem thereof positioned adjacent the planar head of the "T" shaped support boss to secure the mounting hook 31 between the planar head and the cylindrical housing 30. A catching of a fish member upon the hook 31 subsequent to its removal from the "T" shaped support boss 32 effects tensioning of the cable 36 to deflect the indicator leg 40 along the scale 39 through the associated slot that is positioned medially of the scale 39.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing pole and measuring apparatus comprising, in combination, an elongate fishing rod, the elongate fishing rod including a handle fixedly and coaxially mounted to the fishing rod at a rear terminal end thereof, and a fishing reel mounted to the handle, and a scale member secured to the fishing rod in contiguous communication therewith adjacent the handle, and the scale member includes a plurality of mounting clamps securing the scale member to the fishing rod, each clamp defined by a discontinuous band, wherein the discontinuous band includes a first leg and second leg, with a semi-cylindrical recess defined between the first leg and the second leg to receive the fishing pole therewithin, wherein the first leg and the second leg are arranged in surrounding relationship relative to the scale member, and the first leg includes a first toothed surface and the second leg includes a second toothed surface, wherein the first and second toothed surfaces are securable together.

2. An apparatus as set forth in claim 1 wherein the scale member includes a cylindrical housing, wherein the cylindrical housing further includes an arcuate transparent window directed through a wall of the cylindrical housing, and the transparent window overlying an elongate scale surface, the scale surface including a groove coextensive therewith, the groove positioning an indicator leg therebetween, and a through-extending bore directed through the cylindrical housing diametrically opposed to the window, and a hook member positioned underlying the through-extending bore, wherein the hook member includes a pivot ring mounted to the hook member, and a swivel connection mounted to the pivot ring, and the swivel connection secured to a cable, the cable directed through the housing and secured to the indicator leg for effecting deflection of the indicator leg upon deflection of the hook member relative to the housing.

3. An apparatus as set forth in claim 2 including an elongate coil spring directed through the housing between the through-extending bore and the indicator leg, and the housing including an abutment ring mounted within the housing at a forward terminal end of the coil spring, and the coil spring including an abutment disk mounted about the coil spring at a rear terminal end thereof, with the indicator leg and cable mounted to the abutment disk, with the cable directed coaxially through the coil spring.

4. An apparatus as set forth in claim 3 including a pulley positioned overlying the through-extending bore within the housing, wherein the pulley receives the cable thereabout for effecting alignment of the cable with the through-extending bore.

5. An apparatus as set forth in claim 4 wherein the housing includes a "T" shaped support boss, the "T" shaped support boss including a stem fixedly mounted to the housing adjacent the through-extending bore, and the stem mounting a planar head to the stem spaced from the housing, wherein the stem receives the hook member between the planar head and the housing for storage of the hook during periods of non-use.

* * * * *